US012679654B2

(12) United States Patent
Cao et al.

(10) Patent No.: US 12,679,654 B2
(45) Date of Patent: Jul. 14, 2026

(54) MATERIAL CONVEYING METHOD, SYSTEM, AND STORAGE MEDIUM

(71) Applicant: HAI ROBOTICS CO., LTD., Shenzhen (CN)

(72) Inventors: Dongfeng Cao, Shenzhen (CN); Suimei Yang, Shenzhen (CN)

(73) Assignee: HAI ROBOTICS CO., LTD., Shenzhen (CN)

( * ) Notice: Subject to any disclaimer, the term of this patent is extended or adjusted under 35 U.S.C. 154(b) by 397 days.

(21) Appl. No.: 18/397,281

(22) Filed: Dec. 27, 2023

(65) Prior Publication Data

US 2024/0124237 A1 Apr. 18, 2024

Related U.S. Application Data

(63) Continuation of application No. PCT/CN2022/101651, filed on Jun. 27, 2022.

(30) Foreign Application Priority Data

Jun. 29, 2021 (CN) .......................... 202110724428.0

(51) Int. Cl.
*B65G 1/04* (2006.01)
*B25J 9/16* (2006.01)
(Continued)

(52) U.S. Cl.
CPC .......... *B65G 1/1378* (2013.01); *B25J 9/1661* (2013.01); *B25J 9/1664* (2013.01); *B65G 1/0485* (2013.01);
(Continued)

(58) Field of Classification Search
CPC .. B65G 1/1378; B65G 1/1376; B65G 1/0485; B65G 1/1373; B25J 9/1661;
(Continued)

(56) References Cited

U.S. PATENT DOCUMENTS

| | | | | |
|---|---|---|---|---|
| 11,273,985 B2 * | 3/2022 | Lisso | ................. | G06Q 30/0635 |
| 11,971,711 B2 * | 4/2024 | Zhou | ........................ | G05D 1/02 |
| 2019/0367278 A1 | 12/2019 | Bellar et al. | | |

FOREIGN PATENT DOCUMENTS

| | | |
|---|---|---|
| CN | 102633077 A | 8/2012 |
| CN | 103108815 A | 5/2013 |

(Continued)

OTHER PUBLICATIONS

International Search Report PCT/CN2022/101651 mailed Sep. 7, 2022 with English Translation.

(Continued)

*Primary Examiner* — Thomas Randazzo
(74) *Attorney, Agent, or Firm* — Ladas & Parry, LLP

(57) ABSTRACT

Embodiments of the present disclosure provide a material conveying method and apparatus, a device, a system, and a storage medium, applicable to an intelligent warehousing system. The method includes: determining a first order, where the first order includes a target container and a first workstation; determining a second order, where the second order includes the target container and a second workstation; determining to convey the target container to the second workstation according to a relationship of transferability between the second workstation and the first workstation along a conveying line, where the conveying line is connected to the first workstation and the second workstation; and transmitting first indication information to a warehousing robot, transmitting second indication information to the first workstation, and transmitting third indication information to the second workstation.

20 Claims, 6 Drawing Sheets

(51) Int. Cl.
   *B65G 1/137*           (2006.01)
   *G05B 19/418*         (2006.01)
   *G06Q 10/08*          (2024.01)
   *G06Q 10/087*        (2023.01)

(52) U.S. Cl.
   CPC ......... *B65G 1/1373* (2013.01); *B65G 1/1376*
       (2013.01); *G05B 19/41895* (2013.01); *G06Q*
       *10/08* (2013.01); *G06Q 10/087* (2013.01)

(58) Field of Classification Search
   CPC ............ B25J 9/1664; G05B 19/41895; G06Q
       10/087; G06Q 10/08
   See application file for complete search history.

(56)               References Cited

FOREIGN PATENT DOCUMENTS

| | | | |
|---|---|---|---|
| CN | 106269540 A | 1/2017 | |
| CN | 108846609 A | 11/2018 | |
| CN | 108910376 A | 11/2018 | |
| CN | 110304384 A | 10/2019 | |
| CN | 110817224 A * | 2/2020 | .......... B65G 1/1378 |
| CN | 210207684 U | 3/2020 | |
| CN | 111056201 A | 4/2020 | |
| CN | 112278674 A | 1/2021 | |
| CN | 112330249 A * | 2/2021 | .......... B65G 1/1378 |
| CN | 112478342 A | 3/2021 | |
| CN | 113387096 A | 9/2021 | |
| EP | 4342819 A1 * | 3/2024 | .......... B65G 1/1378 |
| JP | 2001325016 A | 11/2001 | |
| WO | WO-2020088132 A1 * | 5/2020 | .............. B65G 1/04 |

OTHER PUBLICATIONS

Author: Yang Rui; Book name: Electrical System and Control Technology of Port Equipment; Published date: Jan. 2020; Publisher: Wuhan University of Technology Press; Related pages: p. 26-27 ; China.

* cited by examiner

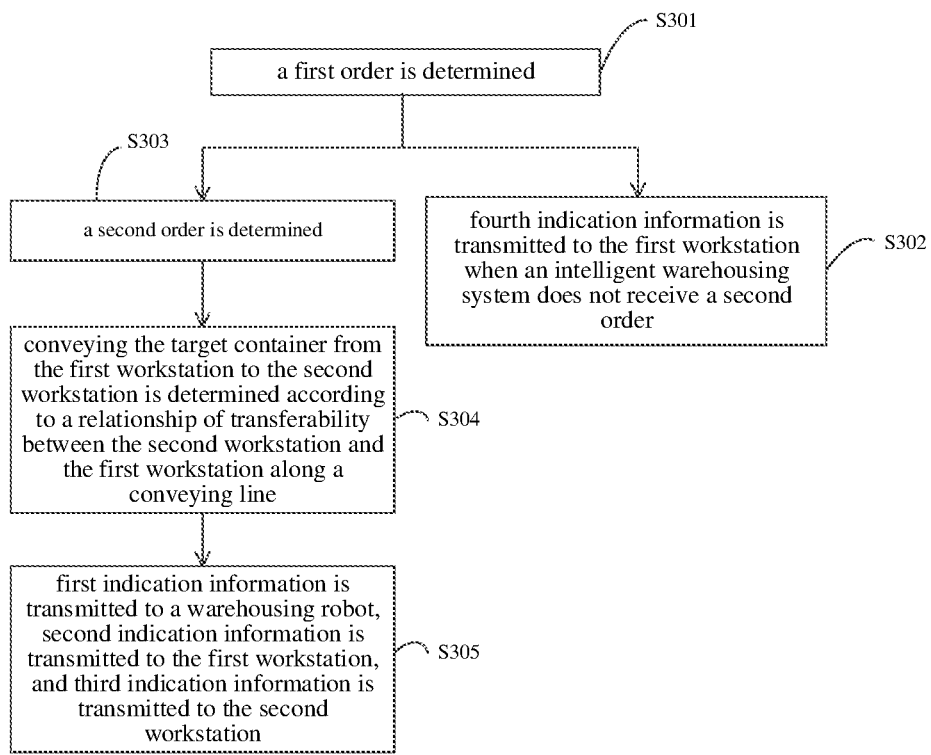

S301 a first order is determined

S303 a second order is determined fourth indication information is transmitted to the first workstation when an intelligent warehousing system does not receive a second order

S302 conveying the target container from the first workstation to the second workstation is determined according to a relationship of transferability between the second workstation and the first workstation along a conveying line

S304 first indication information is transmitted to a warehousing robot, second indication information is transmitted to the first workstation, and third indication information is transmitted to the second workstation

800
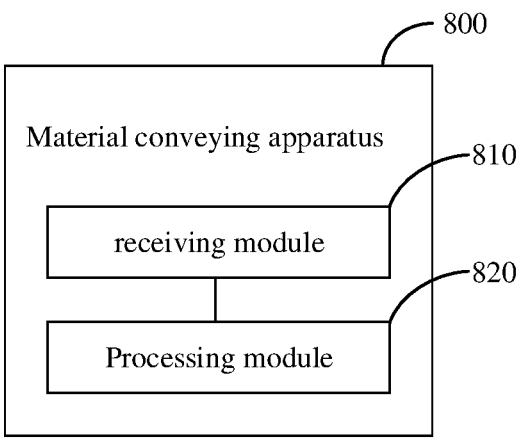
FIG. 8
900
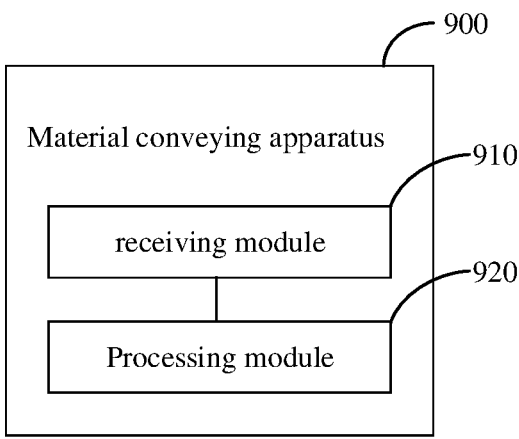
FIG. 9
1000
Control device
1010
Memory
1030
1020
Processor
FIG. 10

MATERIAL CONVEYING METHOD, SYSTEM, AND STORAGE MEDIUM

CROSS-REFERENCE TO RELATED APPLICATIONS

The present disclosure is a Continuation application of International Patent Application No. PCT/CN2022/101651 filed on Jun. 27, 2022, which claims priority to Chinese Patent Application No. 202110724428.0, filed with the China National Intellectual Property Administration on Jun. 29, 2021 and entitled "MATERIAL CONVEYING METHOD AND APPARATUS, DEVICE, SYSTEM, AND STORAGE MEDIUM", which is incorporated herein by reference in its entirety.

TECHNICAL FIELD

The present disclosure relates to the technical field of intelligent warehousing, and in particular, to a material conveying method, a device, a system, and a storage medium.

BACKGROUND

A warehousing system based on a warehousing robot is an intelligent operating system, implements automatic retrieval and storage of goods through system instructions, and may also operate 24 hours a day without interruption, which replaces manual management and operation, improves the efficiency of warehousing, and has been widely applied and favored.

In the current warehousing system, cross-workstation material conveying is cross-workstation transporting performed by a warehousing robot, which has a small single transporting capacity and low conveying efficiency.

SUMMARY

Embodiments of the present disclosure provide a material conveying method and apparatus, a device, a system, and a storage medium, to improve the conveying efficiency of cross-workstation transport.

According to a first aspect, an embodiment of the present disclosure provides a material conveying method, applicable to a server of an intelligent warehousing system. The material conveying method includes: determining a first order, wherein the first order indicates a target container and a first workstation; determining a second order, wherein the second order indicates the target container and a second workstation; determining to convey the target container from the first workstation to the second workstation according to a relationship of transferability between the second workstation and the first workstation along a conveying line, wherein the conveying line is connected to the first workstation and the second workstation; and transmitting first indication information to a warehousing robot, transmitting second indication information to the first workstation, and transmitting third indication information to the second workstation, wherein the first indication information is configured to indicate the warehousing robot to put the target container into the first workstation through a feed port of the first workstation; the second indication information is configured to indicate the first workstation to convey a sorted target container to the conveying line after the target container is sorted by the first workstation; and the third indication information is configured to indicate the second workstation to receive the sorted target container from the conveying line, and return the sorted target container to a warehouse, after the sorted target container is sorted by the second workstation, through a discharge port of the second workstation.

Optionally, when the intelligent warehousing system does not receive the second order, the material conveying method further includes: transmitting fourth indication information to the first workstation, wherein the fourth indication information is configured to indicate the first workstation to sort the target container and return the sorted target container to the warehouse through a discharge port of the first workstation.

Optionally, the determining to convey the target container to the second workstation according to a relationship of transferability between the second workstation and the first workstation along a conveying line includes: determining to convey the target container from the first workstation to the second workstation when the conveying line is a one-way conveying line, and the second workstation is located downstream of the first workstation in a conveying direction along the conveying line.

Optionally, when at least two first workstations are arranged, the determining to convey the target container to the second workstation according to a relationship of transferability between the second workstation and the first workstation along a conveying line includes: determining to convey the target container to the second workstation if one of the at least two first workstations is located upstream of the second workstation in a conveying direction of the conveying line and is at a shortest distance from the second workstation along the conveying line, when a conveying line is an annular conveying line or a one-way conveying line; and correspondingly, the transmitting second indication information to the first workstation includes: transmitting the second indication information to the first workstation at a shortest distance from the second workstation along the conveying line.

Optionally, when at least two second workstations are arranged, the transmitting third indication information to the second workstation includes: determining material receiving priorities of the at least two second workstations; and transmitting the third indication information to the second workstations based on the material receiving priorities.

Optionally, the determining material receiving priorities of the at least two second workstations includes: determining the material receiving priorities of the at least two second workstations based on the conveying direction of the conveying line. A shorter conveying distance from the first workstation indicates a higher material receiving priority of the second workstation.

Optionally, the second order further includes a demand priority of the second workstation for the target container, and the determining material receiving priorities of the at least two second workstations includes: determining the material receiving priorities of the at least two second workstations based on the demand priorities of the at least two second workstations for the target container. A higher demand priority indicates a higher material receiving priority of the second workstation.

Optionally, the second order further indicates a demand quantity of the second workstation for the target container, and the determining material receiving priorities of the at least two second workstations includes: determining the material receiving priorities of the at least two second workstations based on the demand quantities of the at least two second workstations for the target container. A larger demand quantity indicates a higher material receiving priority of the second workstation, or a smaller demand quantity indicates a higher material receiving priority of the second workstation.

Optionally, the second order further includes a deadline for demand of the second workstation for the target container, and the method further includes: determining whether a current moment is before the deadline for demand; if so, transmitting the third indication information to the first workstation; if not, transmitting the fourth indication information to the first workstation; or transmitting fifth indication information to a third workstation located downstream of the second workstation in the conveying direction of the conveying line. The fifth indication information is configured to indicate the third workstation to return the sorted target container to the warehouse through a discharge port of the third workstation.

Optionally, the method further includes: determining whether the second workstation is in an abnormal state; and if so, transmitting fifth indication information to a third workstation located downstream of the second workstation in the conveying direction of the conveying line. The abnormal state includes material accumulation.

Optionally, the determining whether the second workstation is in an abnormal state includes: obtaining material accumulation information corresponding to the second workstation, and determining that the second workstation is in the abnormal state if the material accumulation information indicates that the material accumulation occurs at the second workstation.

Optionally, the method further includes: transmitting sixth indication information to a warehousing robot. The sixth indication information is configured to indicate the warehousing robot to receive the sorted target container through the discharge port of the second workstation and return the sorted target container to the warehouse processing.

According to a second aspect, an embodiment of the present disclosure provides a material conveying method, applicable to a workstation. The material conveying method includes: loading a target container corresponding to a first order into a workstation through a feed port in response to received second indication information; and sorting the target container in the workstation, and conveying the sorted target container to a conveying line.

Optionally, the method further includes: sorting the target container in the workstation and then performing return processing on the sorted target container through a discharge port of the workstation in response to received fourth indication information.

According to a third aspect, an embodiment of the present disclosure provides a material conveying method, applicable to a workstation. The material conveying method includes: receiving a target container corresponding to a second order from a conveying line in response to received third indication information; and sorting the target container in the workstation and then performing return processing on the sorted target container through a discharge port of a workstation.

According to a fourth aspect, an embodiment of the present disclosure provides a material conveying method, applicable to a workstation. The material conveying method includes: receiving, in response to received fifth indication information, a target container corresponding to the fifth indication information from a conveying line; and performing return processing on the target container through a discharge port of the workstation.

According to a fifth aspect, an embodiment of the present disclosure provides a material conveying method, applicable to a warehousing robot. The material conveying method includes: transporting a target container to a feed port of a first workstation in response to received first indication information; and inputting the target container through the feed port.

According to a sixth aspect, an embodiment of the present disclosure provides a material conveying method, applicable to a warehousing robot. The material conveying method includes: receiving a target container through a discharge port of a second workstation in response to received sixth indication information; and perform return processing on the target container.

According to a seventh aspect, an embodiment of the present disclosure provides a material conveying apparatus, applicable to a server of an intelligent warehousing system. The material conveying apparatus includes: a determining module, configured to: determine a first order and a second order, where the first order includes a target container and a first workstation; and determine to convey the target container to the second workstation according to a relationship of transferability between the second workstation and the first workstation along a conveying line, where the second order includes the target container and the second workstation, and the conveying line is connected to the first workstation and the second workstation; and a processing module, configured to transmit first indication information to a warehousing robot, transmit second indication information to the first workstation, and transmit third indication information to the second workstation.

Optionally, the processing module is further configured to transmit fourth indication information to the first workstation when the intelligent warehousing system does not receive the second order.

Optionally, the determining module is further configured to determine to convey the target container to the second workstation if the second workstation is located downstream of the first workstation in a transport direction of the conveying line when the conveying line is a one-way conveying line.

Optionally, the determining module is further configured to determine, when at least two first workstations are arranged, that one of the at least two first workstations is located upstream of the second workstation in a conveying direction of the conveying line and is at a shortest distance from the second workstation along the conveying line, to convey the target container to the second workstation.

Optionally, the determining module is further configured to: determine material receiving priorities of the at least two second workstations when at least two second workstations are arranged; and transmit the third indication information to the second workstations based on the material receiving priorities.

Optionally, the determining module is further configured to determine the material receiving priorities of the at least two workstations in the conveying direction of the conveying line. A shorter conveying distance from the first workstation indicates a higher material receiving priority of the second workstation.

Optionally, the determining module is further configured to determine the material receiving priorities of the at least two second workstations based on the demand priorities of the at least two second workstations for the target container when the second order further includes a demand priority of the second workstation for the target container. A higher demand priority indicates a higher material receiving priority of the second workstation.

Optionally, the determining module is further configured to determine the material receiving priorities of the at least two second workstations based on the demand quantities of the at least two second workstations for the target container when the second order further includes a demand quantity of the second workstation for the target container. A larger demand quantity indicates a higher material receiving priority of the second workstation, or a smaller demand quantity indicates a higher material receiving priority of the second workstation.

Optionally, the determining module is further configured to determine whether a current moment is before a deadline for demand. Correspondingly, the processing module is further configured to: transmit the third indication information to the first workstation if the current moment is before the deadline for demand; if not, transmit the fourth indication information to the first workstation; or transmit fifth indication information to a third workstation located downstream of the second workstation in the conveying direction of the conveying line.

Optionally, the determining module is further configured to determine whether the second workstation is in an abnormal state. Correspondingly, the processing module is further configured to transmit fifth indication information to a third workstation located downstream of the second workstation in the conveying direction of the conveying line if it is determined that the second workstation is in the abnormal state.

Optionally, the determining module is further configured to: obtain material accumulation information corresponding to the second workstation, and determine that the second workstation is in the abnormal state if the material accumulation information indicates that the material accumulation occurs at the second workstation.

Optionally, the processing module is further configured to transmit sixth indication information to a warehousing robot. The sixth indication information is used for indicating that the warehousing robot should receive the sorted target container through the discharge port of the second workstation and perform return processing.

According to an eighth aspect, an embodiment of the present disclosure provides a material conveying apparatus, applicable to a workstation. The material conveying apparatus includes: a receiving module, configured to receive second indication information; and a processing module, configured to: load a target container corresponding to a first order into the workstation through a feed port; and sort the target container in the workstation, and convey the sorted target container to a conveying line.

Optionally, the receiving module is further configured to receive fourth indication information. Correspondingly, the processing module is further configured to: receive a target container corresponding to a second order from the conveying line; and sort the target container in the workstation and then perform return processing on the sorted target container through a discharge port of a workstation.

According to a ninth aspect, an embodiment of the present disclosure provides a material conveying apparatus, applicable to a workstation. The material conveying apparatus includes: a receiving module, configured to receive third indication information; and a processing module, configured to receive a sorted target container from a conveying line, sort the target container, and then perform return processing through a discharge port of a second workstation.

According to a tenth aspect, an embodiment of the present disclosure provides a material conveying apparatus, applicable to a workstation. The material conveying apparatus includes: a receiving module, configured to receive fifth indication information; and a processing module, configured to: receive a target container corresponding to the fifth indication information from a conveying line; and perform return processing on the target container through a discharge port of the workstation.

According to an eleventh aspect, an embodiment of the present disclosure provides a material conveying apparatus, applicable to a warehousing robot. The material conveying apparatus includes: a receiving module, configured to receive first indication information; and a processing module, configured to: transport a target container to a feed port of a first workstation; and input the target container through the feed port.

According to a twelfth aspect, an embodiment of the present disclosure provides a material conveying apparatus, applicable to a warehousing robot. The material conveying apparatus includes: a receiving module, configured to receive sixth indication information; and a processing module, configured to: receive a target container through a discharge port of a second workstation; and perform return processing on the target container.

According to a thirteenth aspect, an embodiment of the present disclosure further provides a control device. The control device includes: at least one processor; and a memory, communicatively connected to the at least one processor.

The memory stores an instruction executable by the at least one processor, and the instruction is executed by the at least one processor, to cause the control device to perform the material conveying method according to the first aspect to the sixth aspect of the present disclosure.

According to a fourteenth aspect, an embodiment of the present disclosure further provides a warehousing system. The warehousing system includes a server, a conveying line, and a warehousing robot and a workstation communicatively connected to the server. The conveying line is configured to be connected to the workstation.

The workstation is configured to acquire indication information transmitted by the server, to perform the material conveying method according to the second aspect to the fourth aspect of the present disclosure on a target container corresponding to the indication information.

The warehousing robot is configured to perform the material conveying method according to the fifth aspect and the sixth aspect of the present disclosure.

The server is configured to perform the material conveying method according to the first aspect of the present disclosure.

Optionally, the workstation includes: a feed port, provided with a loading apparatus, where the loading apparatus is configured to load the target container into the workstation; a discharge port, provided with an unloading apparatus, where the unloading apparatus is configured to unload the target container from the workstation for return processing; and an internal conveying line, connected to the loading apparatus and the unloading apparatus. The internal conveying line is configured to sort the target container and connected to the conveying line to convey the target container.

According to a fifteenth aspect, an embodiment of the present disclosure further provides a computer-readable storage medium. The computer-readable storage medium stores a computer-executable instruction. The computer-executable instruction, when executed by a processor, is used for implementing the material conveying method according to the first aspect to the sixth aspect of the present disclosure.

According to a sixteenth aspect, an embodiment of the present disclosure further provides a computer program product. The computer program product includes a computer-executable instruction. The computer-executable instruction, when executed by a processor, is used for implementing the material conveying method according to the first aspect to the sixth aspect of the present disclosure.

According to the material conveying method and apparatus, the device, the system, and the storage medium provided in the embodiments of the present disclosure, the target container, the first workstation, and the second workstation are respectively determined according to the first order and the second order. It is determined whether the container can be conveyed from the first workstation to the second workstation cross stations according to the relationship of transferability between the second workstation and the first workstation along the conveying line. Then, the indication information is respectively transmitted to the warehousing robot, the first workstation, and the second workstation, to indicate that the first workstation should sort the target container and then unload the target container onto the conveying line. Then the target container is received and sorted through the second workstation, and then the sorted target container is loaded through the discharge port of the second workstation and return processing is performed, thereby realizing automatic cross-workstation conveying. Since the target container between the stations is conveyed through the conveying line, a number of target containers is not limited by a transporting capacity of the warehousing robot. In this way, continuous and large-batch transport can be realized. Since the cross-workstation transport only requires conveying based on the existing conveying line, it is unnecessary to additionally add a device such as the warehousing robot for transport. Therefore, the problem of congestion of the workstations caused by the warehousing robot queuing for transport is significantly alleviated, which effectively ensures the efficiency of goods transport.

BRIEF DESCRIPTION OF THE DRAWINGS

Accompanying drawings herein are incorporated into the specification and constitute a part of this specification, show embodiments that conform to the present disclosure, and are used for explaining the principle of the present disclosure together with this specification.

FIG. 3 a diagram of an application scenario of a workstation according to the present disclosure.

FIG. 8 is a schematic structural diagram of a material conveying apparatus according to still another embodiment of the present disclosure.

FIG. 9 is a schematic structural diagram of a material conveying apparatus according to still another embodiment of the present disclosure.

FIG. 10 is a schematic structural diagram of a control device according to still another embodiment of the present disclosure.

Figure 1:
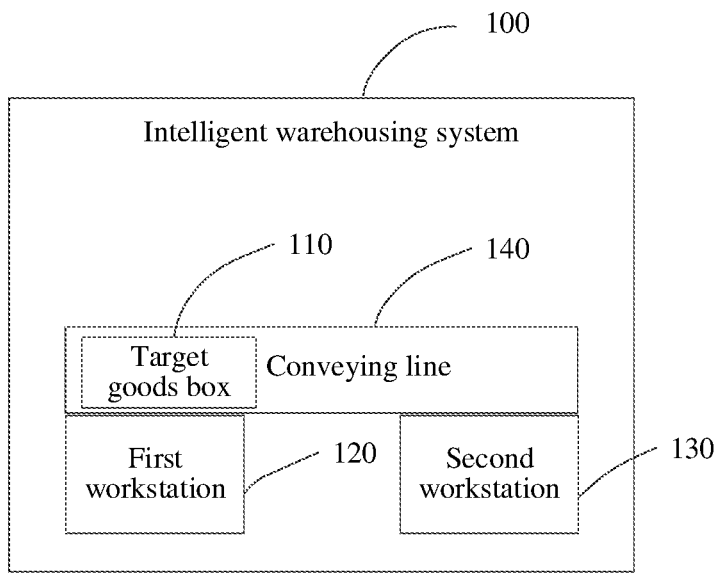
FIG. 1 a diagram of an application scenario of a material conveying method according to an embodiment of the present disclosure.

Specific embodiments of the present disclosure are shown in the above accompanying drawings, which are to be described in more detail later. These accompanying drawings and text description are not intended to limit the scope of the concept of the present disclosure in any way, but to describe the concept of the present disclosure for those skilled in the art with reference to the specific embodiments.

DETAILED DESCRIPTION

Exemplary embodiments are to be described herein in detail, and examples thereof are shown in the accompanying drawings. When the following description relates to the accompanying drawings, unless otherwise stated, the same reference numerals in different accompanying drawings represent the same or similar elements. Implementations described in the following exemplary embodiments do not represent all implementations consistent with the present disclosure. On the contrary, the implementations are merely examples of an apparatus and a method which are consistent with some aspects of the present disclosure described in detail in the attached claims.

The technical solutions of the present disclosure and how to resolve the foregoing technical problems according to the technical solutions of the present disclosure are described in detail below by using specific embodiments. Several specific embodiments may be combined with each other below, and the same or similar concepts or processes may not be described in detail in certain embodiments. The embodiments of the present disclosure are to be described below with reference to the accompanying drawings.

Considering that material conveying by a current intelligent warehousing system is generally performed inside a workstation, temporary transport is generally performed by a warehousing robot when cross-workstation transport is required. Due to a limited single transporting capacity of the warehousing robot and an additional time required for invoking the warehousing robot, the transport efficiency is relatively low. Therefore, when a quantity of materials to be transported across stations exceeds the single transporting capacity of the warehousing robot, a plurality of warehousing robots are required to transport containers, or a single warehousing robot is required to transport the containers a plurality of times, which further reduces the transport efficiency.

In order to solve the problem, the embodiment of the present disclosure provides a material conveying method. The container to be conveyed across stations, a first workstation, and a second workstation are determined according to orders, and the containers to be conveyed across the stations are conveyed through a conveying line connecting two workstations, so as to realize automatic cross-workstation conveying of to-be-transported containers. In this way, large-batch continuous cross-workstation conveying is realized, which not only improves the cross-workstation conveying efficiency, but also avoids workstation congestion caused by the cross-workstation conveying by the warehousing robot.

Application scenarios of the embodiments of the present disclosure are described below.

FIG. 1 is a diagram of an application scenario of a material conveying method according to some embodiments of the present disclosure. As shown in FIG. 1, in a process of material conveying, a server of an intelligent warehousing system 100 determines a target container 110 according to a received order and selects a first workstation 120 configured to input and sort the target container 110. When the intelligent warehousing system 100 receives a second order and the second order also includes the target container 110, a second workstation 130 corresponding to the second order that is configured to receive and sort the target container 110 is determined, and indication information is transmitted, so that after sorting the target container, the first workstation 120 unloads the sorted target container onto a conveying line 140, and the second workstation 130 receives the target container 110 from the conveying line 140, and sorts the target container 110.

It should be noted that the numbers of the first workstation, the second workstation, the target container, and the conveying line in the scenario shown in FIG. 1 are all just examples, with one each being used for illustrative purposes, but the present disclosure is not limited thereto. That is to say, the number of first workstations, the number of second workstations, the number of target containers, and the number of conveying lines may be arbitrary.

The material conveying method provided in the present disclosure is described in detail below by using specific embodiments.

Figure 2:
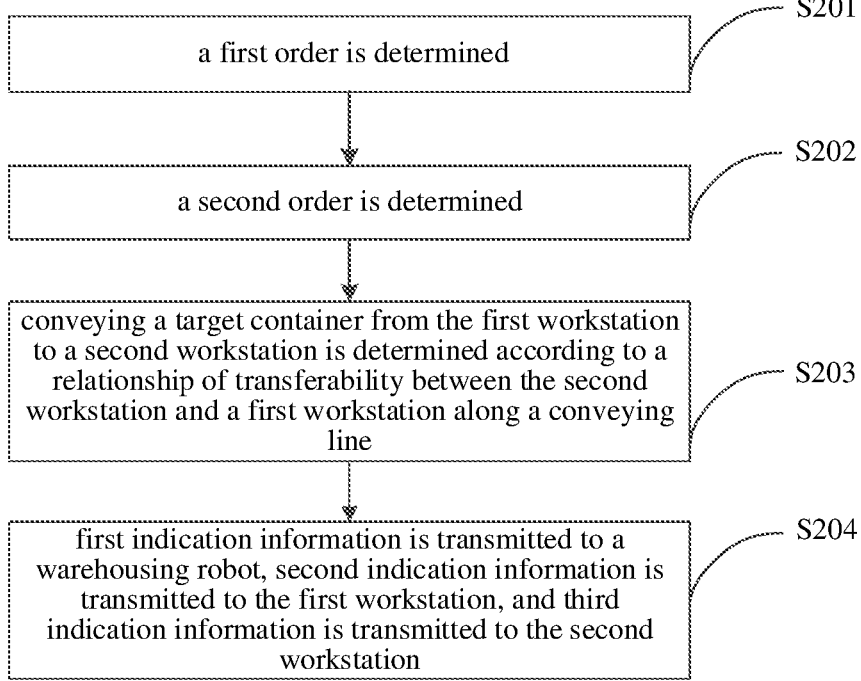
FIG. 2 is a flowchart of a material conveying method according to an embodiment of the present disclosure.

FIG. 2 is a flowchart of a material conveying method according to an embodiment of the present disclosure. The material conveying method is applicable to a server of an intelligent warehousing system. As shown in FIG. 2, the material conveying method provided in this embodiment includes the following operations.

In block S201: a first order is determined.

The first order indicates a target container and a first workstation.

Specifically, a to-be-sorted material corresponding to the first order is placed in the target container in advance. The material may be any piece of goods that can be continuously consumed, for example, the material may be daily consumables, a raw material, or a to-be-processed semi-finished product, or may be any piece of goods that need to be transferred, such as an express item or an express box. The target container may be a container, an express parcel, or a frame container.

The target container is generally determined by the intelligent warehousing system, which may be automatically generated by the intelligent warehousing system after receiving the first order, or may be determined by receiving configurations from a warehousing manager. The target container may be a container in which the materials need to be transported between workstations, sorted and sorted out in the workstations and then ship out the materials; or a container in which to-be stored materials need to be transported to different workstations to facilitate arrangement and storage; or a container in which the materials need to be transported to different workstations, such that the materials are sorted out or inventory checked in different workstations according to requirements for a sorting out task or an inventory checking task.

Further, one or more types of target containers may be included in the material conveying requirements, such as two, three, or more types.

The first workstation is generally determined by the intelligent warehousing system and may be set by a person. The first workstation is configured to receive the target container transported by the warehousing robot and sort the target container according to a material demand quantity in the first order.

Specifically, the method for determining the first workstation generally includes: first selecting a workstation in a normal operating state whose feed port has an increasable supply capacity as the first workstation according to a processing status of each workstation; or selecting a workstation on which the target container is already located, such that no additionally transporting of the target container is needed.

In block S202: a second order is determined.

The second order indicates the target container and a second workstation.

The second order is a new order received by the server of the intelligent warehousing system after receiving the first order and before preforming return processing on the target container corresponding to the first order through the discharge port of the first workstation. In addition, the second order includes the same container as the first order, that is, the target container.

Further, the second order may be an order for the same materials required by different customers, or an order for different batches of the same materials required by the same customer.

The second workstation is a workstation different from the first workstation connected to the same cross-workstation conveying line.

In block S203: conveying a target container from the first workstation to a second workstation is determined according to a relationship of transferability between the second workstation and a first workstation along a conveying line.

The conveying line is connected to the first workstation and the second workstation.

The relationship of transferability between the second workstation and the first workstation along the conveying line is used for representing a situation that the target container can be transferred from the first workstation to the second workstation along the conveying line.

Specifically, the first workstation transfers the target container from the first workstation to the conveying line through a specialized automatic transfer device. The target container may also be transferred through an unloading apparatus in the first workstation. For example, the unloading apparatus directly unloads the target container onto the conveying line.

Further, the second workstation is generally automatically set by the intelligent warehousing system, or may be manually set by the warehousing manager. The setting method is the same as the setting methods of the first workstation.

In block S204: first indication information is transmitted to a warehousing robot, second indication information is transmitted to the first workstation, and third indication information is transmitted to the second workstation.

The first indication information is configured to indicate the warehousing robot to put the target container into the first workstation through a feed port of the first workstation. The second indication information is configured to indicate the first workstation to convey a sorted target container to the conveying line after the target container is sorted by the first workstation. The third indication information is configured to indicate the second workstation to receive the sorted target container from the conveying line, and return the sorted target container to a warehouse, after the sorted target container is sorted by the second workstation, through a discharge port of the second workstation.

The operation of returning in the present disclosure means taking away the material from the conveying line and putting the material back into an inventory area instead of putting the material into the conveying line. The feeding, discharging, or unloading in the present disclosure means putting the material on the conveying line through the feed port rather than taking away the material from the conveying line.

For example, a workstation A, a workstation B, and a workstation C are arranged in a direction of the one-way conveying line from upstream to downstream. The server of the intelligent warehousing system receives the first order, including a target container m, and determines the workstation A as the first workstation. In a process of sorting the container m by the workstation A, a second order is received, and the second order also includes the container m and is targeted at another customer. Therefore, the workstation C is determined as the second workstation corresponding to the second order. The indication information is transmitted to the warehousing robot, so that the warehousing robot transports the container m to the feed port of the workstation A. The container is sorted in the workstation A and then transferred to the conveying line. The workstation C receives the sorted container m. After the container is sorted according to the second order, the container is returned through a discharge port of the workstation C. In this way, the cross-workstation conveying of the container m is realized.

According to the material conveying method provided in the embodiments of the present disclosure, the target container, the first workstation, and the second workstation are first respectively determined according to the first order and the second order. Then it is determined whether the container could be conveyed from the first workstation to the second workstation according to the relationship of transferability between the second workstation and the first workstation along the conveying line. Then, the indication information is respectively transmitted to the warehousing robot, the first workstation, and the second workstation, to indicate that the first workstation to sort the target container and then unload the target container onto the conveying line. Then the target container is received and sorted by the second workstation, and then the sorted target container is loaded through the discharge port of the second workstation and return to a warehouse, thereby realizing automatic cross-workstation conveying. Since the target container between the stations is conveyed through the conveying line, a number of target containers is not limited by a transporting capacity of the warehousing robot. In this way, continuous and large-batch transport can be realized. Since the cross-workstation transport only requires conveying based on the existing conveying line, it is unnecessary to additionally add a device such as the warehousing robot for transport. Therefore, the problem of congestion of the workstations caused by the warehousing robot queuing for transport is significantly alleviated, which effectively ensures the efficiency of goods transport.

FIG. 3 shows a material conveying method according to another embodiment of the present disclosure. The material conveying method provided in embodiment of the present disclosure is a further refinement based on the embodiment shown in FIG. 2. As shown in FIG. 3, the material conveying method provided in this embodiment includes the following operations.

In block S301: a first order is determined.

The first order indicates a target container and a first workstation.

In block S302: fourth indication information is transmitted to the first workstation when an intelligent warehousing system does not receive a second order.

The fourth indication information is configured to indicate the first workstation to sort the target container and return the sorted target container to the warehouse through the discharge port of the first workstation.

Optionally, when the second workstation determined in the second order and the first workstation are the same workstation, the material is conveyed to the discharge port through the feed port inside the workstation. That is to say, the material is conveyed in an existing conventional workstation. If the same customer adds an order for the same batch of same materials that needs to be shipped with the first order on the basis of the first order, it may be determined that the second order continues to be completed by the first workstation, that is, the second workstation and the first workstation determined in the second order are the same workstation.

In block S303: the second order is determined.

The second order indicates the same target container as that indicated by the first order and a second workstation.

In block S304: conveying the target container from the first workstation to the second workstation is determined according to a relationship of transferability between the second workstation and the first workstation along a conveying line.

Specifically, the conveying line connected to a feeding workstation and a receiving workstation may be a one-way conveying line. If the warehousing space is relatively small, the conveying line may be in a linear shape, an L shape, or any non-closed shape, or may be an annular conveying line. The annular conveying line may be a planar annular structure, or may be a three-dimensional annular structure, such as a reciprocating cyclic conveying line in parallel from up to down. When the conveying line is the annular conveying line, the material may pass the same work station a plurality of times. The first workstation and the second workstation are respectively located at any position on the conveying line.

Optionally, when the conveying line is a one-way conveying line, in a transport direction of the conveying line, it is determined that the target container is conveyed to the second workstation if the second workstation is located downstream of the first workstation.

If the second workstation is located upstream of the first workstation, the target container obviously cannot be transferred from the first workstation to the second workstation. In this case, the second workstation and the first workstation are not conveyable along the conveying line.

Optionally, when at least two first workstations are arranged, the determining to convey the target container from the first workstation to the second workstation according to a relationship of transferability between the second workstation and the first workstation along a conveying line includes:

determining to convey the target container from the first workstation to the second workstation if one of the at least two first workstations is located upstream of the second workstation in a conveying direction of the conveying line and is at a shortest distance from the second workstation along the conveying line, when a conveying line is an annular conveying line or a one-way conveying line; and transmitting the second indication information to the first workstation at a shortest distance from the second workstation along the conveying line.

When at least two workstations sort or prepare to sort the same type of target containers, for example, the target containers correspond to different customers, it is necessary to determine that which workstation conveys the target container to the workstation corresponding to the new order, when the server of the intelligent warehousing system receives a new order and the new order is from a new customer who also needs the same type of target container.

When a plurality of first workstations are arranged, the workstation at a shortest conveying distance from the second workstation along the conveying line is first selected for the cross-workstation conveying, so as to reduce a transport time of the target container on the conveying line and improve the transport efficiency.

In block S305: first indication information is transmitted to a warehousing robot, second indication information is transmitted to the first workstation, and third indication information is transmitted to the second workstation.

The first indication information is configured to indicate the warehousing robot to put the target container into the first workstation through a feed port of the first workstation. The second indication information is configured to indicate the first workstation to convey a sorted target container to the conveying line after the target container is sorted by the first workstation. The third indication information is configured to indicate the second workstation to receive the sorted target container from the conveying line, and return the sorted target container to a warehouse, after the sorted target container is sorted by the second workstation, through a discharge port of the second workstation.

Further, when at least two second workstations are arranged, the transmitting third indication information to the second workstation includes: determining material receiving priorities of the at least two second workstations; and transmitting the third indication information to the second workstations based on the material receiving priorities.

When the server receives the first order, the first workstation is determined to execute the first order, and a plurality of new orders are received, if the new orders correspond to different customers and include the same target container, different workstations are required to receive the target container sorted by the first workstation. That is, the second workstation includes a plurality of second workstations. Since there is only one first workstation, it is necessary to determine one second workstation to which the target container is to be conveyed first, so as to satisfy the warehousing requirement to the greatest extent.

The material receiving priority is configured to represent the priority of the second workstation when receiving a specific target container, rather than a priority attribute of the second workstation itself. Therefore, the material receiving priority is a temporary attribute generated by the second workstation based on the specific order and the corresponding target container, rather than a fixed attribute.

Further, the same workstation may have different material receiving priorities when receiving different target containers. For example, a workstation B has the highest priority when receiving the container m, and has the lowest priority when receiving a material n. The same workstation may also have different material receiving priorities when receiving different batches of the same type of target container. For example, the workstation B may respectively have the highest priority and the second highest priority when receiving two successive batches of containers m for being conveyed to different customers.

Optionally, the determining material receiving priorities of the at least two second workstations includes: determining the material receiving priorities of the at least two workstations based on the conveying direction of the conveying line. A shorter conveying distance from the first workstation indicates a higher material receiving priority of the second workstation.

When the customer priorities or target container demand priorities among orders corresponding to the plurality of second workstations are the same, the factor of the conveying distance is first considered, so that a total conveying distance of the target container on the conveying line is as short as possible.

Further, in the case of the one-way conveying line, since the conveying direction of the target container is unidirectional, the upstream or downstream relationship along the conveying direction is first considered. The material receiving priority of the second workstation upstream is higher than that of the second workstation downstream.

Optionally, the second order further indicates a demand priority of the second workstation for the target container, and the determining material receiving priorities of the at least two second workstations includes: determining the material receiving priorities of the at least two second workstations based on the demand priorities of the at least two second workstations for the target container. A higher demand priority indicates a higher material receiving priority of the second workstation.

When a difference in the demand priorities of the target container exists among the orders corresponding to the plurality of second workstations, the demand priority is first considered. The demand priority may be a priority of the customer corresponding to the order, or a priority of the order itself automatically set by the intelligent warehousing system.

Optionally, the order further indicates a demand quantity of the second workstation for the target container, and the determining material receiving priorities of the at least two second workstations includes: determining the material receiving priorities of the at least two second workstations based on the demand quantities of the at least two second workstations for the target container. A larger demand quantity indicates a higher material receiving priority of the second workstation, or a smaller demand quantity indicates a higher material receiving priority of the second workstation.

When the customer priorities among the orders corresponding to the plurality of second workstations are the same, the material receiving priority may be determined according to the demand quantity of the target container. Generally, the requirement of the order having a large demand quantity is first satisfied. For example, in order to improve the efficiency of order completion, the requirement of the order having a small demand quantity may alternatively be satisfied first.

Further, when the demand quantity, the demand priority, and the conveying distance along the conveying direction of the conveying line contradict each other, the priorities of the demand priority, the demand quantity, and the conveying distance along the conveying direction of the conveying line are in descending order.

In some embodiments, a conveying policy may be as follows: In descending order of material receiving priorities, a second workstation having a highest priority receives and sorts all required target containers first, a second workstation having a second highest priority then performs receiving, and so on.

In some embodiments, the conveying policy may be as follows: In descending order of material receiving priorities, a second workstation having a highest priority receives the target container in a set proportion of the demand quantity first, such as 30% or 50% or any other proportion, a second workstation having a second highest priority then performs receiving, and so on. When all of the second workstations receive the target container in the set proportion, the material receiving process is repeated until all of the second workstations receive all requested target containers. Such a conveying policy applies to a workstation in a cycle.

According to options of the second workstation under different situations, the corresponding third indication information is transmitted to the selected workstation.

Step S302 and Step S303 are refinements of Step S202.

For example, a workstation A, a workstation B, and a workstation C spaced apart by the same spacing are arranged in the direction of the conveying line on the circular conveying line. The workstation C cyclically precedes the workstation A. In the existing first order, it is determined that the workstation A sorts the container m, and then the intelligent warehousing system receives two different second orders. The container m respectively needs to be shipped out to two different customers. Therefore, two different workstations are required for receiving the container m so as to avoid confusion. For example, the intelligent warehousing system respectively selects the workstation B and the workstation C as the second workstation. In this case, if the demand priority of the container m of the order corresponding to the workstation C is higher than that of the order corresponding to the workstation B, the workstation C first receives the container m sorted by the workstation A. For example, two second orders have the same demand priority and the same demand quantity, the workstation B may first receive the container m sorted by the workstation A according to the conveying distance on the conveying line, so as to reduce the quantity of materials conveyed across the workstation and the distance of cross-workstation conveying, and improve the conveying efficiency.

In this embodiment, the first order is determined first, so as to determine the target container and the first workstation. Then, it is determined according to whether the second order is received that the first workstation performs return processing on the target container or the second workstation receives the target container. Then conveying priorities of the plurality of second workstations or the plurality of first workstations are determined according to different types of conveying lines, and then the third indication information is transmitted to the second workstation according to the conveying priorities and the second indication information is transmitted to the first workstation. In this way, the conveying priority of the second workstation is selected according to different types of conveying lines and different types of orders. The optimization of the cross-workstation conveying distance and the cross-workstation conveying capacity is ensured while realizing continuous and large-batch cross-workstation transport through the conveying line, thereby effectively ensuring the efficiency of goods transport.

Figure 4:
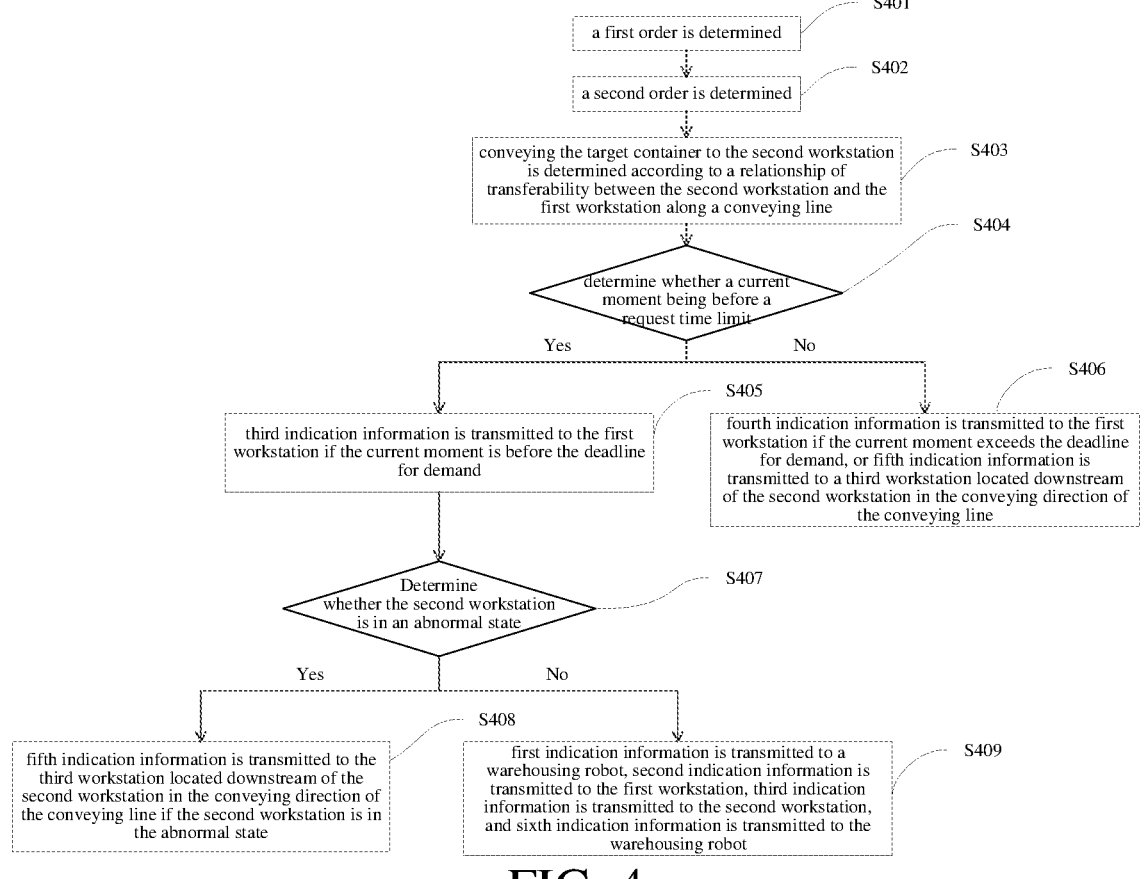
FIG. 4 is a flowchart of a material conveying method according to still another embodiment of the present disclosure.

FIG. 4 is a flowchart of a material conveying method according to still another embodiment of the present disclosure. As shown in FIG. 4, the material conveying method may include the following operations.

In block S401: a first order is determined.

The first order indicates a target container and a first workstation.

In block S402: a second order is determined.

The second order indicates the target container and a second workstation.

In block S403: conveying the target container to the second workstation is determined according to a relationship of transferability between the second workstation and the first workstation along a conveying line.

Step S404: Determine whether a current moment is before a deadline for demand.

Generally, the first order and the second order both indicate the corresponding deadline for demand. Therefore, it is necessary to determine depending on whether the current moment is within the deadline for demand whether to transmit indication information indicating execution of cross-workstation conveying.

When the current moment is within the deadline for demand, the material conveying process may be normally performed. When the current moment exceeds the deadline for demand, the first workstation or the second workstation is generally required to perform a next task of processing an overdue order transmitted by the intelligent warehousing system. For example, the first workstation ships out or stores all containers in the first workstation. In this case, the second workstation can no longer receive the target container.

In block S405: third indication information is transmitted to the first workstation if the current moment is before the deadline for demand.

The third indication information has the same meaning as that in the above embodiment.

In block S406: fourth indication information is transmitted to the first workstation if the current moment exceeds the deadline for demand, or fifth indication information is transmitted to a third workstation located downstream of the second workstation in the conveying direction of the conveying line.

The fourth indication information has the same meaning as that in the above embodiment. The fifth indication information is used for indicating that the third workstation should perform return processing on the sorted target container through a discharge port of the third workstation.

When the deadline for demand is exceeded, it may be directly indicated that the first workstation should sort the target container and then perform return processing if the target container is still in the first workstation. If the target container is transferred to the conveying line by the first workstation, it may be indicated that the third workstation located downstream of the second workstation should receive the target container and perform return processing.

In block S407: whether the second workstation is in an abnormal state is determined.

The abnormal state includes material accumulation or container accumulation.

It further needs to determine whether the second workstation is in a normal state before the second workstation transmits the indication information indicating receipt of the target container.

Specifically, material accumulation information corresponding to the second workstation is obtained, and if the material accumulation information indicates that the material accumulation occurs at the second workstation, it is determined that the second workstation is in the abnormal state.

The material accumulation information may be a prompt message transmitted to the intelligent warehousing system by the second workstation, or may be a prompt message transmitted to the intelligent warehousing system by a sorting person.

The material accumulation is a condition that the second workstation receives excessively many materials and cannot continue to receive the target container. In this case, the second workstation cannot continue performing the material conveying task. In this case, the target container is generally returned to the warehouse, to prevent the target container from accumulating on the conveying line.

Specifically, the material accumulation may also be a condition that too many materials exist on the conveying line connected to different workstations, and the target container cannot be transferred to the conveying line. Since the target container is not on the conveying line at this time, the problems of cross-workstation conveying and reception do not occur.

Optionally, when a plurality of second workstations are arranged and only part of the second workstations are in the abnormal state, the indication information for continuing to perform the material conveying task is transmitted to other second workstations that operate normally. The target container corresponding to the second workstation in the abnormal state is directly returned to the warehouse from the corresponding first workstation or the third workstation located downstream of the second workstation, to avoid further accumulation of the material.

In block S408: fifth indication information is transmitted to the third workstation located downstream of the second workstation in the conveying direction of the conveying line if the second workstation is in the abnormal state.

The third workstation is generally the workstation adjacent to the second workstation in the conveying direction of the conveying line, so as to reduce the conveying distance.

In block S409: first indication information is transmitted to a warehousing robot, second indication information is transmitted to the first workstation, third indication information is transmitted to the second workstation, and sixth indication information is transmitted to the warehousing robot.

The sixth indication information is configured to indicate that the warehousing robot to receive the sorted target container through a discharge port of the second workstation and perform return processing.

Specifically, the sixth indication information may be transmitted after information about completion of sorting transmitted from the second workstation is received, so as to avoid congestion of the warehousing robot at the discharge port of the second workstation.

Optionally, when the target container needs to be returned through the third workstation located downstream of the second workstation, seventh indication information is transmitted to the warehousing robot. The seventh indication information is used for indicating that the warehousing robot should receive the sorted target container through a discharge port of the third workstation and perform return processing.

Operations in block S403, block S404, and block S407 are refinements of operation in block S203. Operations in block S405, block S406, block S408, and block S409 are refinements of operation in block S204.

In this embodiment, it is determined, by determining whether the second workstation is in the abnormal state and whether the second order exceeds the deadline for demand, whether the second workstation continues to receive the target container, or the third workstation located downstream of the second workstation receives and returns the target container, so as to avoid the congestion of the conveying line and the workstation caused when the second workstation cannot continue to operate, thereby ensuring the efficiency of subsequent material conveying.

Figure 5:
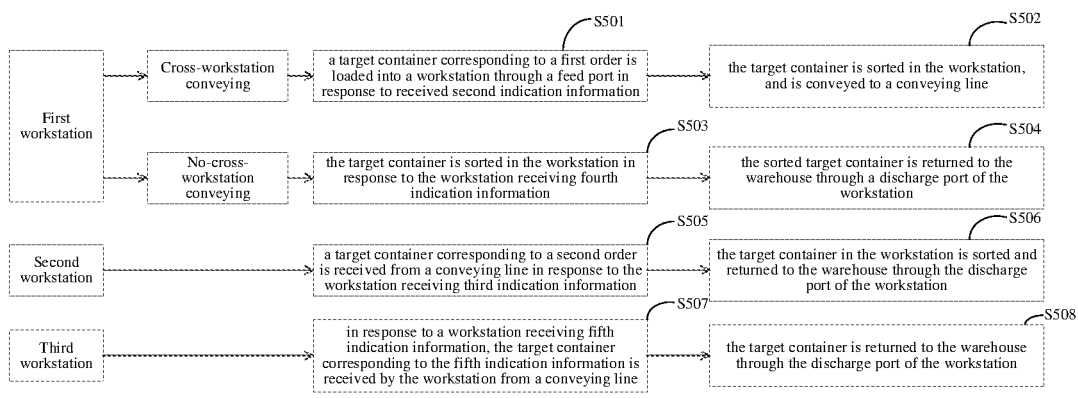
FIG. 5 is a flowchart of a material conveying method according to still another embodiment of the present disclosure.

FIG. 5 is a flowchart of a material conveying method according to still another embodiment of the present disclosure. The material conveying method provided in this embodiment is applied to a workstation. As shown in FIG. 5, the material conveying method may include the following operations.

In block S501: a target container corresponding to a first order is loaded into a workstation through a feed port in response to received second indication information.

In block S502: the target container is sorted in the workstation, and is conveyed to a conveying line.

Operations in block S501 and block S502 are the material conveying method performed by the intelligent warehousing system according to the first workstation determined by the first order, which corresponds to the condition that the cross-workstation conveying is required after the target container is sorted in the first workstation in any embodiment of FIG. 2 to FIG. 4.

In block S503: the target container is sorted in the workstation in response to the workstation receiving fourth indication information.

In block S504: the sorted target container is returned to the warehouse through a discharge port of the workstation.

Operations in block S503 and block S504 are the material conveying method performed by the intelligent warehousing system according to the first workstation determined by the first order, which corresponds to the condition that the return processing is directly performed without performing the cross-workstation conveying after the target container is sorted in the first workstation in any embodiment of FIG. 3 to FIG. 4.

In block S505: a target container corresponding to a second order is received from a conveying line in response to the workstation receiving third indication information.

In block S506: the target container in the workstation is sorted and returned to the warehouse through the discharge port of the workstation.

Operations in block S503 and block S504 are the material conveying method performed by the intelligent warehousing system according to the second workstation determined by the second order, which corresponds to the condition that the target container conveyed across the workstation is received from the conveying line and sorted in the second workstation, and then the return processing is performed through a discharge port of the second workstation in any embodiment of FIG. 2 to FIG. 4.

Optionally, when it is detected that the second workstation is in an abnormal condition, a prompt message indicating the abnormal state is transmitted to the server of the intelligent warehousing system.

In this case, the intelligent warehousing system determines that the second workstation is in an abnormal state according to the received prompt message.

The second workstation detects whether the material accumulation occurs through a sensor in the workstation or a sensor at a connecting portion between the second workstation and the conveying line. If the sensor detects, in half a minute, that more than a set quantity of containers pass through the connecting portion between the second workstation and the conveying line, or the sensor detects that a movement speed of the container is less than a set speed, it indicates that the material accumulation or the congestion occurs on the conveying line or in the second workstation. In this case, a controller in the workstation transmits the prompt message indicating the abnormal state to the server of the intelligent warehousing system.

In block S507: in response to a workstation receiving fifth indication information, the target container corresponding to the fifth indication information is received by the workstation from a conveying line.

In block S508: the target container is returned to the warehouse through the discharge port of the workstation.

Operations in block S507 and block S508 are the material conveying method performed by a third workstation located downstream of the second workstation and determined by the intelligent warehousing system, which corresponds to a condition in the embodiment corresponding to FIG. 4 that when the second workstation is in the abnormal state or the second order exceeds the deadline for demand, the third workstation directly receives the target container conveyed across the workstation from the conveying line, and directly performs return processing through a discharge port of the third workstation.

In this embodiment, the workstation is determined as the first workstation, the second workstation, or the third workstation through the received indication information, and performs the corresponding operation, so as to complete the cross-workstation conveying process of the target container. The cross-workstation conveying and sorting of the same target containers through different workstations can improve the efficiency of the material conveying and the sorting.

Figure 6:
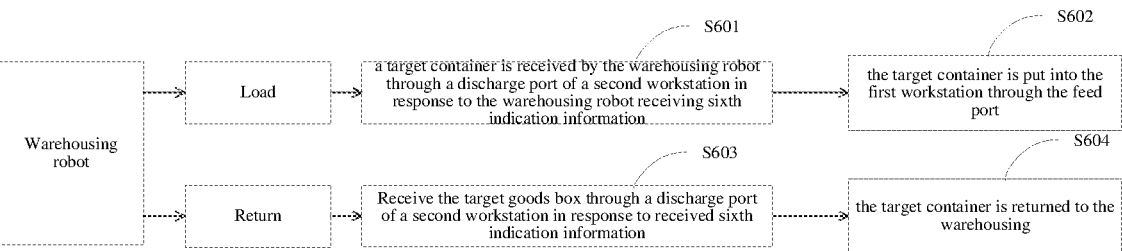
FIG. 6 is a flowchart of a material conveying method according to still another embodiment of the present disclosure.

FIG. 6 is a flowchart of a material conveying method according to still another embodiment of the present disclosure. The material conveying method provided in this embodiment is applied to a robot. As shown in FIG. 6, the material conveying method may include the following operations.

In block S601: a target container is transported to a feed port of a first workstation in response to the warehousing robot receiving first indication information.

In block S602: the target container is put into the first workstation through the feed port.

Operations in block S601 and block S602 are the material conveying method, determined by the intelligent warehousing system, for transporting the target container to the first workstation and performed by the warehousing robot, which corresponds to the operation to be performed before the sorting in the first workstation corresponding to the first order after the first order is determined in any embodiment in FIG. 2 to FIG. 4, that is, a condition that the target container is transported to the feed port of the first workstation from an inventory area where the target container is located.

One or more warehousing robots may receive the first indication information, which is determined according to the quantity of target containers corresponding to the first order. The target containers may be transported by a plurality of warehousing robots simultaneously, or may be transported by a single warehousing robot repeatedly or once. The plurality of warehousing robots may receive the first indication information simultaneously, or may receive the indication information in chronological order, and transport the target containers in order, to prevent the feed port of the first workstation from being congested.

In block S603: a target container is received by the warehousing robot through a discharge port of a second workstation in response to the warehousing robot receiving sixth indication information.

Optionally, the step performed by the warehousing robot corresponding to step S603 further includes: receiving a target container through a discharge port of a third workstation in response to received seventh indication information.

In block S604: the target container is returned to the warehousing.

Operations in block S603 and block S604 are the material conveying method, determined by the intelligent warehousing system, for returning the target container through the discharge port of the second workstation or the third workstation and performed by the warehousing robot, which corresponds to a condition that the target container is returned after being conveyed across the workstations in any embodiment from FIG. 2 to FIG. 4.

In this embodiment, the warehousing robot determines to transport the target container to the feed port of the first workstation or perform return processing on the target container, so as to complete the whole process of the cross-workstation conveying of the containers and avoid the situation of low efficiency and congestion caused by the transport of the warehousing robot in the whole process. In this way, the efficiency of material sorting and conveying is ensured.

Figure 7:
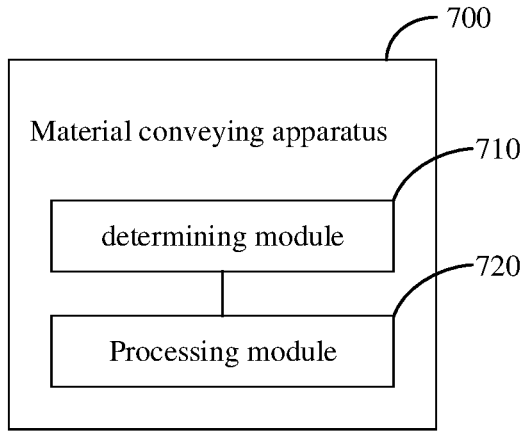
FIG. 7 is a schematic structural diagram of a material conveying apparatus according to still another embodiment of the present disclosure.

FIG. 7 is a schematic structural diagram of a material conveying apparatus according to an embodiment of the present disclosure. The material conveying apparatus is applicable to an intelligent warehousing system. As shown in FIG. 7, the material conveying apparatus includes a determining module 710 and a processing module 720.

The determining module 710 is configured to: determine a first order and a second order, where the first order indicates a target container and a first workstation; and determine to convey the target container from the first workstation to the second workstation according to a relationship of transferability between the second workstation and the first workstation along a conveying line. The second order indicates the target container and the second workstation, and the conveying line is connected to the first workstation and the second workstation.

The processing module 720 is configured to transmit first indication information to a warehousing robot, transmit second indication information to the first workstation, and transmit third indication information to the second workstation.

Optionally, the processing module 720 is further configured to transmit fourth indication information to the first workstation when the intelligent warehousing system does not receive the second order.

Optionally, the determining module 710 is further configured to determine to convey the target container to the second workstation if the second workstation is located downstream of the first workstation in a transport direction of the conveying line when the conveying line is a one-way conveying line.

Optionally, the determining module 710 is further configured to determine, when at least two first workstations are arranged, that one of the at least two first workstations is located upstream of the second workstation in a conveying direction of the conveying line and is at a shortest distance from the second workstation along the conveying line, to convey the target container from the first workstation to the second workstation.

Optionally, the determining module 710 is further configured to: when at least two second workstations are arranged, determine material receiving priorities of the at least two second workstations; and transmit the third indication information to the second workstations based on the material receiving priorities.

Optionally, the determining module 710 is further configured to determine the material receiving priorities of the at least two workstations in the conveying direction of the conveying line. A shorter conveying distance from the first workstation indicates a higher material receiving priority of the second workstation.

Optionally, the determining module 710 is further configured to determine the material receiving priorities of the at least two second workstations based on the demand priorities of the at least two second workstations for the target container when the second order further indicates a demand priority of the second workstation for the target container. A higher demand priority indicates a higher material receiving priority of the second workstation.

Optionally, the determining module 710 is further configured to determine the material receiving priorities of the at least two second workstations based on the demand quantities of the at least two second workstations for the target container when the order further includes a demand quantity of the second workstation for the target container. A larger demand quantity indicates a higher material receiving priority of the second workstation, or a smaller demand quantity indicates a higher material receiving priority of the second workstation.

Optionally, the determining module 710 is further configured to determine whether a current moment is before a deadline for demand. Correspondingly, the processing module is further configured to: transmit the third indication information to the first workstation if the current moment is before the deadline for demand; if not, transmit the fourth indication information to the first workstation; or transmit fifth indication information to a third workstation located downstream of the second workstation in the conveying direction of the conveying line.

Optionally, the determining module 710 is further configured to determine whether the second workstation is in an abnormal state. Correspondingly, the processing module is further configured to transmit fifth indication information to a third workstation located downstream of the second workstation in the conveying direction of the conveying line if it is determined that the second workstation is in the abnormal state.

Optionally, the determining module 710 is further configured to: obtain material accumulation information corresponding to the second workstation, and determine that the second workstation is in the abnormal state if the material accumulation information indicates that the material accumulation occurs at the second workstation.

Optionally, the processing module 720 is further configured to transmit sixth indication information to a warehousing robot. The sixth indication information is used for indicating that the warehousing robot should receive the sorted target container through the discharge port of the second workstation and perform return processing.

In this embodiment, through combination of the modules, the material conveying apparatus can select the first workstation and the second workstation according to the containers that need to be conveyed, and perform the corresponding material conveying task, so as to realize the cross-workstation conveying along the conveying line and improve the material conveying efficiency.

FIG. 8 is a schematic structural diagram of a material conveying apparatus according to an embodiment of the present disclosure. The material conveying apparatus is applicable to a workstation. As shown in FIG. 8, the material conveying apparatus includes a receiving module 810 and a processing module 820.

The receiving module 810 is configured to receive second indication information.

The processing module 820 is configured to: load a target container corresponding to a first order into the workstation through a feed port; and sort the target container in the workstation, and convey the sorted target container to a conveying line.

In this case, the workstation to which the material conveying apparatus is applied is the first workstation determined by the first order, and the first workstation needs to perform cross-workstation conveying in this case.

Optionally, the receiving module 810 is further configured to receive fourth indication information. Correspondingly, the processing module 820 is further configured to: receive a target container corresponding to a second order from the conveying line; and sort the target container in the workstation and then perform return processing on the sorted target container through a discharge port of a workstation.

In this case, the workstation to which the material conveying apparatus is applied is the first workstation determined by the first order, and the first workstation does not need to perform cross-workstation conveying in this case.

Alternatively, the receiving module 810 is configured to receive third indication information.

The processing module 820 is configured to receive a sorted target container from a conveying line, sort the target container, and then perform return processing through a discharge port of a second workstation.

In this case, the workstation to which the material conveying apparatus is applied is the second workstation determined by the second order.

Alternatively, the receiving module 810 is configured to receive fifth indication information.

The processing module 820 is configured to: receive a target container corresponding to the fifth indication information from a conveying line; and perform return processing on the target container through a discharge port of the workstation.

In this case, the workstation to which the material conveying apparatus is applied is a third workstation determined by an intelligent warehousing system.

In this embodiment, through combination of the modules, the material conveying apparatus can be determined as the first workstation, the second workstation, or the third workstation according to the indication information and perform the corresponding material conveying task, so as to realize the cross-workstation conveying along the conveying line and improve the material conveying efficiency.

FIG. 9 is a schematic structural diagram of a material conveying apparatus according to an embodiment of the present disclosure. The material conveying apparatus is applicable to a warehousing robot. As shown in FIG. 9, the material conveying apparatus includes a receiving module 910 and a processing module 920.

The receiving module 910 is configured to receive first indication information.

The processing module 920 is configured to: transport a target container to a feed port of a first workstation; and input the target container through the feed port.

In this case, the workstation to which the material conveying apparatus is applied is the warehousing robot determined by an intelligent warehousing system that performs conveying according to the target container of the first order.

Alternatively, the receiving module 910 is configured to receive sixth indication information.

The processing module 920 is configured to receive the target container through a discharge port of a second workstation; and perform return processing on the target container.

Optionally, the receiving module 910 is further configured to receive seventh indication information. Correspondingly, the processing module 920 is further configured to: receive the target container through a discharge port of a third workstation; and perform return processing on the target container.

In this case, the workstation to which the material conveying apparatus is applied is the warehousing robot determined by an intelligent warehousing system that performs return processing on the target container.

In this embodiment, through combination of the modules, the material conveying apparatus can determine to perform a task of transporting or returning according to the indication information, so as to complete the cross-workstation conveying along the conveying line and improve the material conveying efficiency.

FIG. 10 is a schematic structural diagram of a control device according to an embodiment of the present disclosure. As shown in FIG. 10, the control device 1000 includes a memory 1010 and a processor 1020.

The memory 1010 stores a computer program executable by at least one processor 1020. The computer program is executed by the at least one processor 1020, so that the control device implements the material conveying method provided in any embodiment above.

The memory 1010 and the processor 1020 may be connected through a bus 1030.

Relevant descriptions may be understood by correspondingly referring to the relevant descriptions and effects corresponding to the method embodiments, and the details are not described herein.

Figure 11:
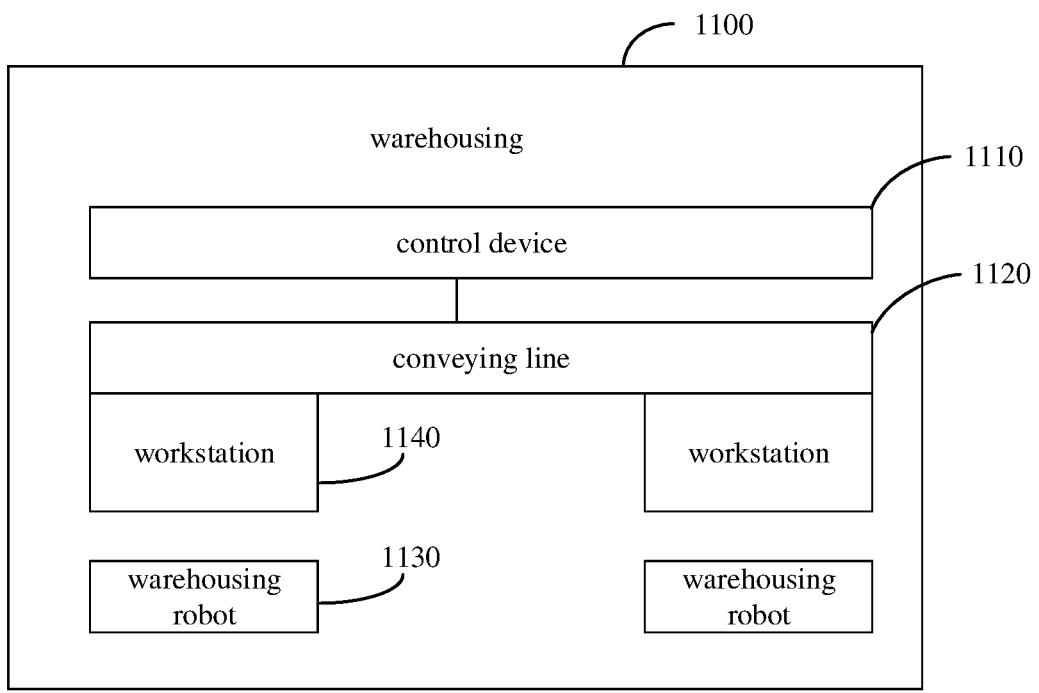
FIG. 11 is a schematic structural diagram of a warehousing system according to an embodiment of the present disclosure.

FIG. 11 is a schematic structural diagram of a warehousing system according to an embodiment of the present disclosure. As shown in FIG. 11, the warehousing system 1100 includes: a server 1110, a conveying line 1120, and a warehousing robot 1130 and a workstation 1140 communicatively connected to the server. The conveying line 1120 is configured to be connected to the workstation 1140.

The workstation 1140 is configured to acquire indication information transmitted by the server to perform the material conveying method according to the second aspect to the fourth aspect of the present disclosure on a target container corresponding to the indication information.

The warehousing robot 1130 is configured to perform the material conveying method according to the fifth aspect to the sixth aspect of the present disclosure.

The server 1110 is configured to perform the material conveying method according to the first aspect of the present disclosure.

Optionally, the workstation 1140 includes:

a feed port (not shown), provided with a loading apparatus, where the loading apparatus is configured to load the target container into the workstation;

a discharge port (not shown), provided with an unloading apparatus, where the unloading apparatus is configured to unload the target container from the workstation for return processing; and an internal conveying line (not shown), connected to the loading apparatus and the unloading apparatus. The internal conveying line is configured to sort the target container and connected to the conveying line to convey the target container.

The internal conveying line may be an annular conveying line. In this case, the loading apparatus and the unloading apparatus may be located at any side of the annular conveying line, or may be a U-shaped conveying line. In this case, the loading apparatus and the unloading apparatus may be respectively located on two ends of the U-shaped conveying line.

An embodiment of the present disclosure provides a computer-readable storage medium, storing a computer program therein. The computer program is executed by a processor to implement the material conveying method provided in any of the method embodiments.

The computer-readable storage medium may be a ROM, a random access memory (RAM), a CD-ROM, a magnetic tape, a floppy disk, an optical data storage device, and the like.

An embodiment of the present disclosure provides a computer program product, including a computer-executable instruction. The computer-executable instruction, when executed by a processor, is used for implementing the material conveying method provided in the above method embodiment.

It is to be understood that the disclosed apparatus and method in the several embodiments provided in the present disclosure may be implemented in other manners. For example, the apparatus embodiments described above are merely exemplary. For example, division of modules is merely logical function division and may be other division manners during actual implementation. For example, a plurality of modules or components may be combined or integrated into another system, or some features may be omitted or not executed. In addition, the displayed or discussed mutual coupling or direct coupling or communication connections may be implemented by some interfaces. The indirect coupling or communication connection between the apparatuses or modules may be electrical, mechanical, or in other forms.

A person skilled in the art can easily figure out other implementations of the present disclosure after considering the specification and practicing the disclosure disclosed herein. The present disclosure is intended to cover any variations, uses, or adaptive changes of the present disclosure. These variations, uses, or adaptive changes follow the general principles of the present disclosure and include the common general knowledge or common technical means in the technical field which are not disclosed in the present disclosure. The specification and the embodiments are considered as merely exemplary, and the true scope and spirit of the present disclosure are indicated by the following claims.

It is to be understood that the present disclosure is not limited to the precise structures described above and shown in the accompanying drawings, and various modifications and changes can be made without departing from the scope of the present disclosure. The scope of the present disclosure is subject only to the attached claims.

What is claimed is:

1. A material conveying method, applicable to a server of an intelligent warehousing system, comprising:

determining a first order, wherein the first order indicates a target container and a first workstation;

determining a second order, wherein the second order indicates the target container and a second workstation;

determining to convey the target container from the first workstation to the second workstation according to a relationship of transferability between the second workstation and the first workstation along a conveying line, wherein the conveying line is connected to the first workstation and the second workstation; and transmitting first indication information to a warehousing robot, transmitting second indication information to the first workstation, and transmitting third indication information to the second workstation, wherein the first indication information is configured to indicate the warehousing robot to put the target container into the first workstation through a feed port of the first workstation; the second indication information is configured to indicate the first workstation to convey a sorted target container to the conveying line after the target container is sorted by the first workstation; and the third indication information is configured to indicate the second workstation to receive the sorted target container from the conveying line, and return the sorted target container to a warehouse, after the sorted target container is sorted by the second workstation, through a discharge port of the second workstation.

2. The material conveying method according to claim 1, wherein when the intelligent warehousing system does not receive the second order, the material conveying method further comprises:

transmitting fourth indication information to the first workstation, wherein the fourth indication information is configured to indicate the first workstation to sort the target container and return the sorted target container to the warehouse through a discharge port of the first workstation.

3. The material conveying method according to claim 1, wherein the determining to convey the target container from the first workstation to the second workstation according to a relationship of transferability between the second workstation and the first workstation along a conveying line comprises:

determining to convey the target container from the first workstation to the second workstation when the conveying line is a one-way conveying line, and the second workstation is located downstream of the first workstation in a conveying direction along the conveying line.

4. The material conveying method according to claim 1, wherein when at least two first workstations are arranged, the determining to convey the target container from the first workstation to the second workstation according to a relationship of transferability between the second workstation and the first workstation along a conveying line comprises:

determining to convey the target container from the first workstation to the second workstation when one of the at least two first workstations is located upstream of the second workstation in a conveying direction of the conveying line and is at a shortest distance from the second workstation along the conveying line when a conveying line is an annular conveying line or a one-way conveying line; and correspondingly, the transmitting second indication information to the first workstation comprises:

transmitting the second indication information to the first workstation at the shortest distance from the second workstation along the conveying line.

5. The material conveying method according to claim 1, wherein the second order further indicates a deadline for demand of the second workstation for the target container, and the method further comprises:

determining whether a current moment is before the deadline for demand;

when the current moment is before the deadline for demand, transmitting the third indication information to the first workstation; and when the current moment is not before the deadline for demand, transmitting the fourth indication information to the first workstation; or transmitting fifth indication information to a third workstation located downstream of the second workstation in the conveying direction of the conveying line, wherein the fourth indication information is configured to indicate the first workstation to sort the target container and return the sorted target container to the warehouse through a discharge port of the first workstation; and the fifth indication information is configured to indicate the third workstation to return the sorted target container to the warehouse through a discharge port of the third workstation.

6. The material conveying method according to claim 1, further comprising:

transmitting sixth indication information to a warehousing robot, wherein the sixth indication information is configured to indicate the warehousing robot to receive the sorted target container through the discharge port of the second workstation and return the sorted target container to the warehouse processing.

7. The material conveying method according to claim 1, further comprising:

determining whether the second workstation is in an abnormal state; and when the second workstation is in the abnormal state, transmitting fifth indication information to a third workstation located downstream of the second workstation in the conveying direction of the conveying line, wherein the abnormal state comprises material accumulation; and the fifth indication information configured to indicates the third workstation to return the sorted target container to the warehouse through a discharge port of the third workstation.

8. The material conveying method according to claim 7, wherein the determining whether the second workstation is in an abnormal state comprises:

obtaining material accumulation information corresponding to the second workstation, and determining that the second workstation is in the abnormal state when the material accumulation information indicates that the material accumulation occurs at the second workstation.

9. The material conveying method according to claim 1, wherein when at least two second workstations are arranged, the transmitting third indication information to the second workstation comprises:

determining material receiving priorities of the at least two second workstations; and transmitting the third indication information to the second workstations based on the material receiving priorities.

10. The material conveying method according to claim 9, wherein the determining material receiving priorities of the at least two second workstations comprises:

determining the material receiving priorities of the at least two second workstations based on the conveying direction of the conveying line, wherein a shorter conveying distance from the first workstation indicates a higher material receiving priority of the second workstation.

11. The material conveying method according to claim 9, wherein the second order further indicates a demand priority of the second workstation for the target container, and the determining material receiving priorities of the at least two second workstations comprises:

determining the material receiving priorities of the at least two second workstations based on the demand priorities of the at least two second workstations for the target container, wherein a higher demand priority indicates a higher material receiving priority of the second workstation.

12. The material conveying method according to claim 9, wherein the second order further indicates a demand quantity of the second workstation for the target container, and the determining material receiving priorities of the at least two second workstations comprises:

determining the material receiving priorities of the at least two second workstations based on the demand quantities of the at least two second workstations for the target container, wherein a larger demand quantity indicates a higher material receiving priority of the second workstation; or a smaller demand quantity indicates a higher material receiving priority of the second workstation.

13. A warehousing system, comprising: a server, a conveying line, a warehousing robot, a first workstation and a second workstation, wherein the warehousing robot and the workstation are communicatively connected to the server, the conveying line is configured to be connected to the first workstation and the second workstation;

the server is configured to:

determine a first order, wherein the first order indicates a target container and a first workstation;

determine a second order, wherein the second order indicates the target container and a second workstation;

transmit first indication information to a warehousing robot, transmit second indication information to the first workstation, and transmit third indication information to the second workstation;

the conveying line is configured to convey the target container from the first workstation to the second workstation according to a relationship of transferability between the second workstation and the first workstation along a conveying line;

the warehousing robot is configured to put the target container into the first workstation according to the first indication information;

the first workstation is configured to convey a sorted target container to the conveying line after the target container is sorted by the first workstation according to the second indication information; and the second workstation is configured to receive the sorted target container from the conveying line and return the sorted target container to a warehouse after the sorted target container is sorted by the second workstation according to the third indication information.

14. The warehousing system according to claim 13, wherein each of the first workstation and the second workstation comprises:

a feed port, provided with a loading apparatus, wherein the loading apparatus is configured to load the target container into the workstation, and the warehousing robot is configured to put the target container into the first workstation through the feed port of the first workstation;

a discharge port, provided with an unloading apparatus, wherein the unloading apparatus is configured to unload the target container from the workstation for return processing, and the second workstation is configured to return the sorted target container to a warehouse through the discharge port of the second workstation; and an internal conveying line, connected to the loading apparatus and the unloading apparatus, wherein the internal conveying line is configured to sort the target container and connected to the conveying line to convey the target container.

15. The warehousing system according to claim 13, wherein when the warehousing system does not receive the second order, the server is configured to transmit fourth indication information to the first workstation; and the first workstation is configured to sort the target container and return the sorted target container to the warehouse.

16. The warehousing system according to claim 13, wherein the conveying line is configured to convey the target container from the first workstation to the second workstation, when the conveying line is a one-way conveying line, and the second workstation is located downstream of the first workstation in a conveying direction along the conveying line; or when one of the at least two first workstations is located upstream of the second workstation in a conveying direction of the conveying line and is at a shortest distance from the second workstation along the conveying line when a conveying line is an annular conveying line or a one-way conveying line.

17. The warehousing system according to claim 13, wherein when the warehousing system comprises at least two workstations, the server is configured to determine material receiving priorities of the at least two second workstations and transmit the third indication information to the second workstations based on the material receiving priorities.

18. The warehousing system according to claim 17, wherein the material receiving priorities of the at least two second workstations are determined based on:

the conveying direction of the conveying line, wherein a shorter conveying distance from the first workstation indicates a higher material receiving priority of the second workstation; or demand priorities of the at least two second workstations for the target container, wherein a higher demand priority indicates a higher material receiving priority of the second workstation, wherein the demand priorities of the at least two second workstations are indicated by the second order; or demand quantities of the at least two second workstations for the target container, wherein a larger demand quantity indicates a higher material receiving priority of the second workstation; or a smaller demand quantity indicates a higher material receiving priority of the second workstation; wherein the demand quantities of the at least two second workstations are indicated by the second order.

19. A non-transitory computer-readable storage medium, storing a computer-executable instruction, the computer-executable instruction, when executed by a processor, is configured to implement operations of:

determining a first order, wherein the first order indicates a target container and a first workstation;

determining a second order, wherein the second order indicates the target container and a second workstation;

determining to convey the target container from the first workstation to the second workstation according to a relationship of transferability between the second workstation and the first workstation along a conveying line, wherein the conveying line is connected to the first workstation and the second workstation; and transmitting first indication information to a warehousing robot, transmitting second indication information to the first workstation, and transmitting third indication information to the second workstation, wherein the first indication information is configured to indicate the warehousing robot to put the target container into the first workstation through a feed port of the first workstation; the second indication information is configured to indicate the first workstation to convey a sorted target container to the conveying line after the target container is sorted by the first workstation; and the third indication information is configured to indicated the second workstation to receive the sorted target container from the conveying line, and return the sorted target container to a warehouse, after the sorted target container is sorted by the second workstation, through a discharge port of the second workstation.

20. The non-transitory computer-readable storage medium according to claim 19, wherein when at least two second workstations are arranged, the transmitting third indication information to the second workstation comprises:

determining material receiving priorities of the at least two second workstations; and transmitting the third indication information to the second workstations based on the material receiving priorities;

wherein the determining material receiving priorities of the at least two second workstations comprises at least one of:

determining the material receiving priorities of the at least two second workstations based on the conveying direction of the conveying line, wherein a shorter conveying distance from the first workstation indicates a higher material receiving priority of the second workstation;

determining, when the second order further indicates a demand priority of the second workstation for the target container, the material receiving priorities of the at least two second workstations based on the demand priorities of the at least two second workstations for the target container, wherein a higher demand priority indicates a higher material receiving priority of the second workstation; and determining, when the second order further indicates a demand quantity of the second workstation for the target container, the material receiving priorities of the at least two second workstations based on the demand quantities of the at least two second workstations for the target container, wherein a larger demand quantity indicates a higher material receiving priority of the second workstation; or a smaller demand quantity indicates a higher material receiving priority of the second workstation.

\* \* \* \* \*